United States Patent

Stevens et al.

[15] 3,638,512

[45] Feb. 1, 1972

[54] WINDSCREEN WIPERS

[72] Inventors: Derek Norman Stevens; Peter James Underwood, both of Dunstable, England

[73] Assignee: General Motors Corporation, Detroit, Mich.

[22] Filed: Sept. 11, 1970

[21] Appl. No.: 71,440

[30] Foreign Application Priority Data

Sept. 12, 1969 Great Britain......................45,228/69

[52] U.S. Cl..............................74/595, 15/250.34, 74/519
[51] Int. Cl. .........................................................B60s 1/34
[58] Field of Search ............................74/595, 519; 91/339; 15/250.34, 250.31, 250.27; 287/93, 96

[56] References Cited

UNITED STATES PATENTS

| 1,897,007 | 2/1933 | Hueber et al. ......................15/250.34 |
| 2,836,841 | 6/1958 | Oishei et al..........................15/250.27 |

*Primary Examiner*—William F. O'Dea
*Assistant Examiner*—F. D. Shoemaker
*Attorney*—William A. Schuetz and Warren E. Finken

[57] ABSTRACT

In contrast to the customary windscreen wiper actuator mechanisms in which a rotary spindle, journaled in a fixed housing, carries a crank at one end and has a wiper arm fixed on the other end, the present invention provides an arrangement in which a rotary tubular housing is journaled on a fixed spindle secured to a frame member, the housing being a hollow cylinder closed at one end and serrated at the closed end so as to carry the wiper arm and the open end of the cylinder having a radial flange to which the crank is secured.

3 Claims, 3 Drawing Figures

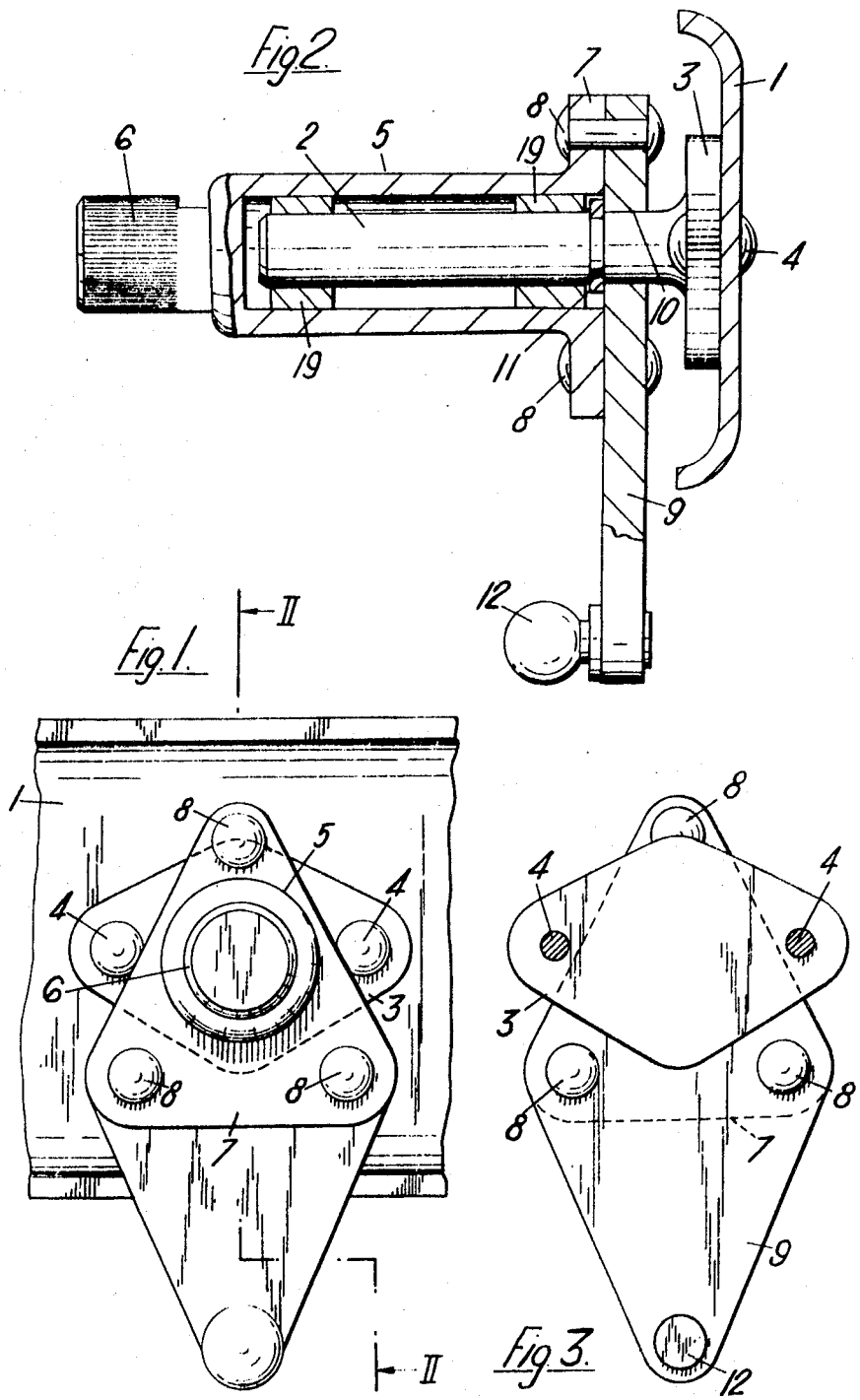

WINDSCREEN WIPERS

This invention relates to windscreen wipers for motor vehicles and more particular to a windscreen wiper actuator mechanism.

A windscreen wiper actuator mechanism according to the invention comprises a support frame, a spindle fixed to and projecting from one side of said frame, a hollow housing member one end of which is rotatably mounted on the free end of said spindle and the other end of which is adapted to have a wiper arm secured thereon, and an oscillatory crank member which is secured to said one end of the housing member and is rotatably mounted on said spindle intermediate said one end and said frame member.

The crank member is secured against axial movement on said spindle, conveniently by means of a circlip fitted in a groove on the spindle.

The said other end of the housing is closed and is conveniently formed with external longitudinal serrations which interengage with complementary serrations, such as are commonly provided on the interior of a socket at the end of a wiper arm, to enable the wiper arm to be secured against rotation on the housing and in a desired position of angular movement relative thereto.

Bearing sleeves may be interposed between the housing and the spindle; and the crank member may carry at its free end a pivotal connection for the attachment thereto of a link by which the oscillatory crank member is adapted to be connected to the drive crank of a windscreen wiper motor, which may also be carried on said support frame.

The scope of the invention is defined by the appended claims; and the invention and the method by which it is to be performed are hereinafter particularly described with reference to the accompanying drawings in which:

FIG. 1 is a front elevation of a windscreen wiper actuator mechanism according to the invention;

FIG. 2 is a section on the line II—II of FIG. 1; and

FIG. 3 is a rear elevation of the mechanism shown in FIG. 1, the support frame being omitted.

The windscreen wiper actuator mechanism shown in the drawings comprises a support frame 1 carrying a spindle 2 formed at one end with an enlarged head 3 of substantially elliptical plate form which is secured by rivets 4 to one side of the support frame 1 or may be welded thereto.

Rotatably mounted on the free end of the spindle 2 is a housing member 5 formed as a hollow cylinder one end of which is closed and is formed with external serrations 6 for the attachment thereto of a windscreen wiper arm socket (not shown). The open end of the housing member 5 is formed with an integral radial flange 7 which is pierced at three points for the reception of rivets 8. Preferably, as shown, bearing sleeves 19 are interposed between the spindle 2 and housing 5 adjacent opposite ends of the spindle.

An oscillatory crank member 9 is formed as an elongate plate with an aperture 10 therein by which it is rotatably mounted on the spindle 2 between the flange 7 and head 3; and around the axis of the aperture 10 the crank member 9 is pierced with openings which are aligned with those formed in the flange 7 of the housing member 5, the crank member 9 being secured to the housing by the rivets 8 which are fixed in the aligned openings of the housing flange 7 and the crank member 9.

The spindle 2 is formed with a circumferential groove in which is located a circlip 11 by which the crank member 9 is secured against axial movement towards the free end of the spindle 2, the projecting portion of the circlip 11 being accommodated within the open end of the housing 5.

At its free end the crank member 9 has secured therein a ball member 12 which forms one part of a ball and socket connector by which the end of the crank member 9 can be connected, as by a link, to the drive crank of a windscreen wiper motor (not shown) which may, if desired, be carried on the support frame 1.

In order to assemble the parts the spindle 2 is first passed through the aperture in the crank member 9 and the circlip 11 is then fitted in the groove on the spindle 2 to locate the crank member 9 axially thereon. The spindle 2 is then inserted into the open end of the housing 5 until the housing flange 7 abuts the crank member 9, the housing flange 7 then being secured to the crank member 9 by the rivets 8. The assembly thus formed is then secured to the support frame 1 by the rivets 4.

The above arrangement has a number of advantages compared with the arrangement commonly employed for the mounting of windscreen wiper arms, in which a housing is fixed to a support and a rotary spindle is mounted within the housing and transmits rotary movement from an oscillatory crank attached to one end of the spindle to a wiper arm mounted on the other end of the spindle. This known arrangement is subject to the following disadvantages:

1. There is an interface with relative movement between housing and spindle, externally of the vehicle, to which rainwater can obtain ingress.
2. Of the two main components, the housing and spindle, the least suitable member, namely, the spindle, is subjected to torsional loads.
3. The oscillatory crank has to be located on the opposite side of the support member from the main body of the housing.

The construction according to the present invention obviates the above disadvantages and provides a simple and inexpensive assembly.

We claim:

1. A windscreen wiper actuator mechanism, comprising a support frame; a spindle fixed to and projecting from one side of said frame; a hollow cylindrical housing member one end of which is open and is rotatably mounted on the free end of said spindle and the other end of which is closed and is formed with external longitudinal serrations thereon for the attachment of a windscreen wiper arm to said closed end; and an oscillatory crank member one end of which is secured to said one end of the housing member and is rotatably mounted on said spindle intermediate said one end of the housing member and said support frame; and means on the other end of said crank member for the pivotal connection thereto of a crank drive member.

2. A windscreen wiper actuator mechanism, according to claim 1, in which said crank member is secured against axial movement on said spindle by a circlip fitted in an annular groove in said spindle.

3. A windscreen wiper actuator mechanism, according to claim 2, in which said spindle is a rod formed at one end with an enlarged head by which it is fixed to said support frame; and said housing is a hollow cylinder the open end of which is formed with an integral radial flange said flange being secured to said crank member.

* * * * *